(12) United States Patent
Anderson et al.

(10) Patent No.: US 6,855,404 B2
(45) Date of Patent: Feb. 15, 2005

(54) INORGANIC SHEET LAMINATE

(75) Inventors: David Wayne Anderson, Chester, VA (US); Dariusz Wlodzimierz Kawka, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/388,066

(22) Filed: Mar. 13, 2003

(65) Prior Publication Data
US 2004/0180228 A1 Sep. 16, 2004

(51) Int. Cl.$^7$ .......................... B32B 5/24; B32B 19/04; B32B 27/10; B32B 27/12; B32B 27/36

(52) U.S. Cl. .................. 428/213; 428/430; 428/443; 428/446; 428/458; 428/480; 428/702; 442/172; 442/178; 442/179; 442/180; 442/286; 442/287; 442/295; 442/296; 442/394; 442/395; 172/137 R; 172/120 R; 172/121 R; 172/121 SR; 172/122 R; 172/122 G; 172/124 R; 172/124 G; 172/110 SR; 172/110 PM; 162/135; 162/138; 162/154; 162/152; 162/153; 162/156; 162/164.1; 162/164.6; 162/181.1; 162/181.4; 162/181.6; 162/181.7; 162/181.8

(58) Field of Search .................. 428/213, 430, 428/443, 446, 458, 480, 702, 426, 454, 457; 442/117, 172, 178, 179, 180, 286, 287, 295, 296, 394, 395, 376; 174/137 R, 110 R, 120 R, 121 R, 121 SR, 122 R, 122 G, 124 R, 124 G, 110 SR, 110 PM; 162/135, 138, 141, 145, 152, 153, 156, 161.1, 164.6, 181.1, 181.4, 181.6, 181.7, 181.8

(56) References Cited

U.S. PATENT DOCUMENTS

| | | | | |
|---|---|---|---|---|
| 3,655,565 A | * | 4/1972 | McDonald | 524/449 |
| 3,993,828 A | * | 11/1976 | McCorsley, III | 442/244 |
| 4,308,093 A | * | 12/1981 | Bodendorf et al. | 162/152 |
| 4,606,785 A | * | 8/1986 | Zeise | 156/305 |
| 4,931,358 A | * | 6/1990 | Wahl et al. | 442/242 |
| 5,021,283 A | * | 6/1991 | Takenaka et al. | 428/116 |
| 5,079,077 A | * | 1/1992 | Sakayanagi et al. | 442/212 |
| 5,145,811 A | * | 9/1992 | Lintz et al. | 501/95.1 |
| 5,989,702 A | * | 11/1999 | Draper et al. | 428/328 |
| 6,117,509 A | * | 9/2000 | Lee | 428/40.1 |
| 2002/0007022 A1 | * | 1/2002 | Oosedo et al. | 525/527 |

* cited by examiner

Primary Examiner—Vivian Chen

(57) ABSTRACT

A laminate of inorganic sheet and polyester resin having an overall thickness of 5 to 25 mils and having an elongation at break in both the cross direction and machine direction of at least 25%.

16 Claims, 2 Drawing Sheets

INORGANIC SHEET LAMINATE

BACKGROUND OF THE INVENTION

The present invention is directed to a improved laminate of inorganic sheet and polyester polymer, preferably a laminate of two inorganic sheets separated by a polyester polymer layer. Such laminates are useful in transformers and other electrical devices wherein the laminate serves as dielectric insulation material. Such laminates need to have folding endurance and toughness. Any improvement in the internal adhesion of the laminate or the tear or elongation at break properties of such laminates is desirable.

SUMMARY OF THE INVENTION

The present invention is directed to a laminate of inorganic sheet and polyester resin having an overall thickness of 5 to 25 mils and having an elongation at break in both the cross direction and the machine direction of at least 25%. Preferably, the elongation at break in the cross direction is at least 30%. In one embodiment of this invention, the thickness of the resin layer in the laminate can be greater than the thickness of any individual nonwoven sheet in the laminate. It is preferred the nonwoven inorganic sheet be a paper and that the paper include an inorganic mineral such as aluminum silicate, an inorganic reinforcement such as glass fiber, and a binder such as acrylonitrile latex. The preferred polyester resins useful in the laminate are poly(ethylene terephthalate) and poly(ethylene naphthalate).

DETAILED DESCRIPTION OF THE INVENTION

Figure 1:
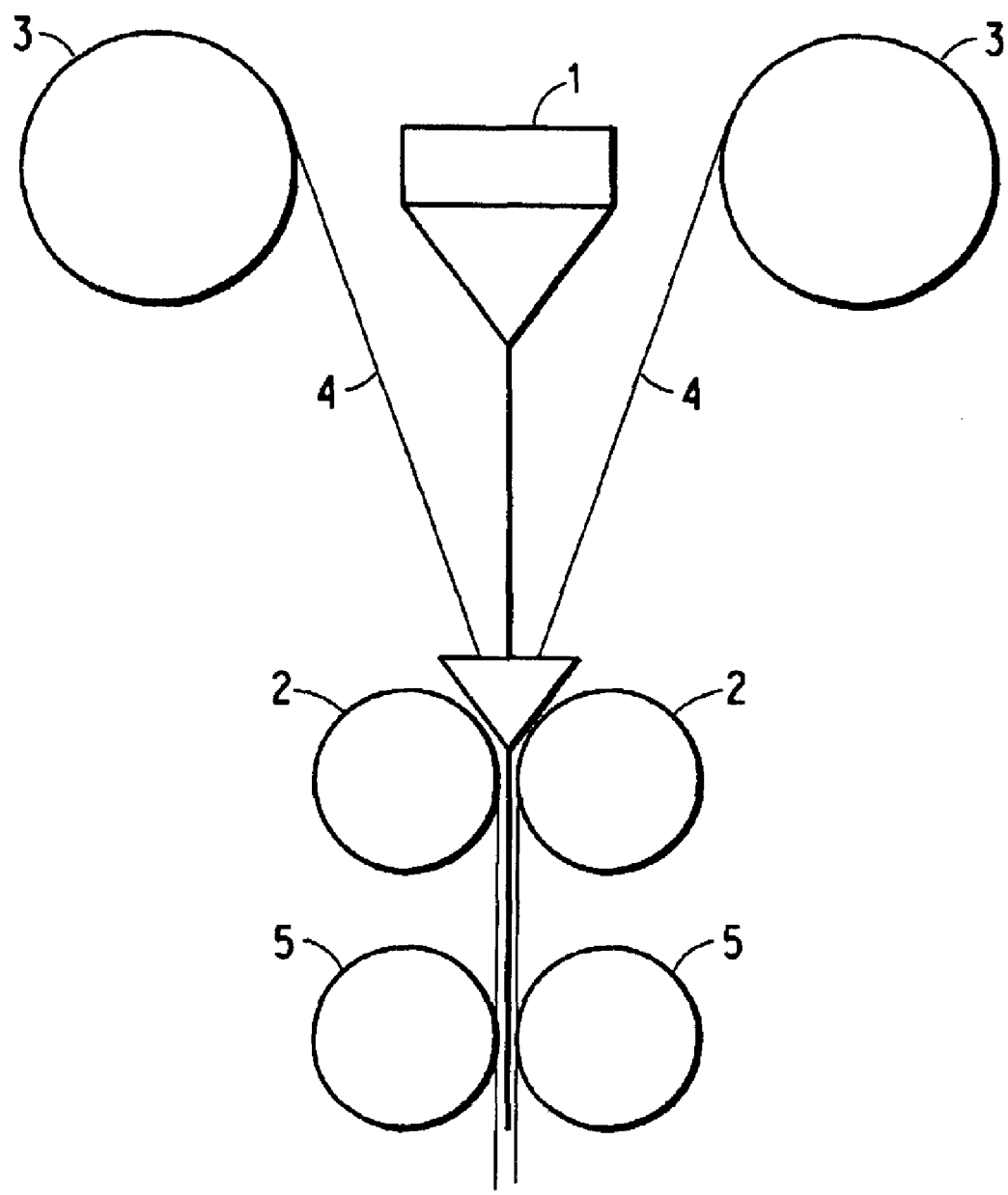
FIG. 1 is a simplified representation of an extrusion lamination process useful in making the laminates of this invention.

Laminates made from inorganic sheets or papers and polyester resin films have been used in transformers and other electrical devices wherein the laminate serves as dielectric insulation material. It is desired that such insulative laminates have a combination of physical properties which are especially suited for the needs of transformer manufacturers. These properties include in addition to insulative properties, other mechanical properties which include initial tear resistance (as measured by elongation at break) and high resistance to tear propagation (as measured by average tear load). These properties are especially useful in evaluating insulative laminates because in the manufacture of transformers there is the likelihood the insulative laminate will be damaged during assembly.

It has been found that the elongation and tear properties of inorganic insulative laminates can be improved by replacing the form of the polyester that is used in the laminates. In particular, it has been found that a laminate made with a molten polyester resin has improved elongation and tear properties over laminates made with films.

Typically, laminates used in the prior art for electrical insulation have utilized polyester film. Since polyester film by itself does not have good adhesion to inorganic sheet, adhesives have been used to attach the films to the inorganic sheet. The films were attached to the inorganic sheet by first coating an adhesive onto the film and then laminating the coated film onto the inorganic sheet at high temperature. It is believed that the use of polyester in film form in the laminate limits the elongation and tear properties of the final laminate, in that typical processes for forming a solid film impart crystallinity and orientation into the polyester layer. This is believed to reduce the flexibility, toughness, and tear resistance of the final laminate.

The laminates of this invention utilize inorganic sheet or paper, the terms meant to be used interchangeably herein. The sheets or papers utilized in this invention can be prepared using conventional paper-making processes and equipment and processes. The terms "cross direction" and "machine direction" are well-known in the art and refer to orthogonal directions in the sheet where physical properties are measured; the machine direction runs parallel with the windup direction of the paper machine and the cross direction traverses the paper machine. The inorganic papers of this invention can contain a mineral component, an inorganic reinforcing component, and a binder. These components are combined in a water slurry and cast onto a screen where they are dewatered, optionally pressed, and dried. Layers of these sheets can be combined to build a certain thickness of paper, and such papers can be further consolidated by calendaring or other densifying processes. The mineral and/or inorganic material useful in the making of the inorganic papers and sheets used in this invention include but are not limited to glass, aluminum silicate, and/or mixtures of these with other inorganic fillers; such inorganic materials may be present in fiber form. Useful binders include, but are not limited to, acrylonitrile latex. The preferred laminates of this invention are made from CeQuin® and TufQuin® inorganic sheets available from Quin-T Corporation, Tilton, N.H.

The thickness of the inorganic sheet is not critical and is dependent upon the end use of the laminate as well as the number of inorganic layers employed in the final laminate. Although the present invention may employ two layers, i.e. one inorganic layer and one polymer layer, and preferably employs three layers, i.e. two inorganic sheet layers and one polymer layer, it is understood that there is no upper limit in the number of layers or other materials which can be present in the final article.

As employed herein the term inorganic means that the primary constituents are non-hydrocarbon clays, fibers, flakes, platelets or other structures, particularly naturally-occurring minerals such as aluminum silicate, and processed inorganic materials such as glass fiber.

The preferred polymers applied to the inorganic sheet in this invention are polyethylene terephthalate (PET) and polyethylene naphthalate (PEN). These polymers may include a variety of comonomers, including diethylene glycol, cyclohexanedimethanol, poly(ethylene glycol), glutaric acid, azelaic acid, sebacic acid, isophthalic acid, and the like. In addition to these comonomers, branching agents like trimesic acid, pyromellitic acid, trimethylolpropane and trimethyloloethane, and pentaerythritol may be used. The PET may be obtained by known polymerization techniques from either terephthalic acid or its lower alkyl esters (e.g. dimethyl terephthalate) and ethylene glycol or blends or mixtures of these. PEN may be obtained by known polymerization techniques from 2,6-naphthalene dicarboxylic acid and ethylene glycol.

One method of making the laminates of this invention is by extruding molten polymer between two inorganic sheets followed by pressing and quenching to form the laminate.

The molten resin can be extruded onto the inorganic sheets in any number of ways. For example, the resin may be extruded onto one inorganic sheet and then covered with a second inorganic sheet and then laminated using a press or laminating rolls. Referring to FIG. 1, in a preferred method, the molten resin is supplied to a slotted die 1 from an extruder. The slotted die is oriented so that a sheet of molten resin is extruded in a downward fashion to a set of horizontal laminating rolls 2. Two supply rolls of inorganic sheet 3 provide two separate webs 4 of inorganic sheet to the laminating rolls and both webs and the sheet of molten resin all meet in the nip of the laminating rolls with the resin positioned between the two webs. The rolls consolidate the webs and resin together; the consolidated laminate is then quenched using a set of cooled rolls 5. The laminate may then be cut to appropriate size as needed for the application.

In another embodiment of this invention, the combination of molten polymers may extruded in a manner which layers the different polymers between the two inorganic sheets. For example, the polymer layer could consist of three layers such as, in order, a layer of PET polymer having a first intrinsic viscosity, a layer of PET polymer having a second intrinsic viscosity, and a third layer of PET polymer having the same intrinsic viscosity as the first layer. In this manner a PET polymer having more affinity to inorganic sheets can be employed to incorporate a PET polymer having less affinity to inorganic sheets into the laminate.

The laminates of this invention have a thickness of from 5 to 25 mils and have an elongation at break in both the cross and machine directions of at least 25%. The preferred laminates of this invention have a cross-direction elongation at break of at least 30% and an machine-direction elongation at break of at least 25%. Generally such laminates will have a resin thickness greater than any one inorganic sheet in the laminate.

In the following examples all parts and percentages are by weight unless otherwise indicated. Initial tear resistance was measured via elongation at break per ASTM D1004. Tear propagation resistance was measured via average tear load by ASTM D1938.

EXAMPLE 1

This example illustrates some of the problems encountered in the lamination of inorganic paper to polyester polymer without adhesives and the adhesion attained by this invention. Two types of sheets are used in this example; an inorganic paper in an as-purchased condition (specifically TufQuin® manufactured by Quin-T Corporation), and a carrier sheet of meta-aramid paper which was highly calendered so that molten polyester polymer would not adhere to it.

A heated press was used to laminate poly (ethylene terephthalate) polyester having an intrinsic viscosity of 0.60 dl/g between combinations of the two sheets of papers as below. No adhesive, chemical, flame, heat, or corona treatment or similar activation of the paper surface was required for the polyester polymer to adhere to the inorganic paper. Heated press conditions are shown in Table 1.

Test A—Small pellets of polyester polymer were placed between two inorganic sheets and the combination placed in the heated press. The polyester pellets melted and flowed between the sheets. The binder used in inorganic sheet also melted and flowed, dissolving the combination of sheets and polymer into an unusable laminate.

Test B—Small pellets of polyester polymer were placed between two inorganic sheets and the combination placed in the heated press, but held for a shorter period of time than for Test A. The polyester pellets melted and flowed between the sheets. The binder used in inorganic sheet also melted and flowed but the combination of sheets and polymer retained its integrity. However, the laminate was brittle and effectively unusable.

Test C—Small pellets of polyester polymer were placed on one meta-aramid sheet in a heated unclosed press. After five minutes in the heated unclosed press, the polymer pellets had melted and flowed on surface of the aramid sheet. After the aramid sheet and molten polyester polymer were removed from the press, and while the polymer was still molten, one sheet of inorganic paper was manually pressed onto the surface of the molten polyester polymer. The laminate was immediately quenched to prevent melting of the binder used in the inorganic sheet. Good adhesion between inorganic sheet and polyester polymer was noted without embrittlement of the inorganic sheet.

TABLE 1

| Test: | 1 | 2 | 3 |
|---|---|---|---|
| Paper Type | two sheets of inorganic paper | two sheets of inorganic paper | one sheet each of aramid paper and inorganic paper |
| Press Temperature (° C.) | 288 | 288 | 288 |
| Time in Press (min) | 5 | 2.5 | 5 |
| Time out of Press (min) | 0 | 0 | 5 |
| Polymer Thickness (in) | 0.005 | 0.005 | 0.005 |

EXAMPLE 2

This example illustrates the properties of the laminates of this invention made by extrusion lamination, versus laminates made by adhesive lamination. The extrusion laminates were made as follows. Inorganic paper (specifically CeQuin® manufactured by Quin-T Corporation) was used as purchased. Molten poly(ethylene terephthalate) (PET) polymer in the form of a three-layered combination or co-extrusion of PET polymers having intrinsic viscosities of 0.65/0.85/0.65 dl/g, respectively, was applied to the surfaces of the paper by extrusion lamination of polyester polymer between the two papers. No adhesive, chemical, flame, heat, or corona treatment or similar activation of the paper surface was required for the polyester polymer to adhere to the inorganic paper. These extrusion laminates were compared to commercially available adhesive laminates used in electrical insulation containing a polyester film adhesively laminated between two inorganic papers (CeQuin® laminates manufactured by and commercially available from Quin-T).

Samples of laminate produced in this manner were tested per ASTM D1004 ("Test Method for Initial Tear Resistance in Plastic Film and Sheeting") and ASTM D1938 ("Test Method for Tear Propagation Resistance of Plastic Film and Sheeting by a Single-Tear Method") to assess the tear properties achieved.

Figure 2:
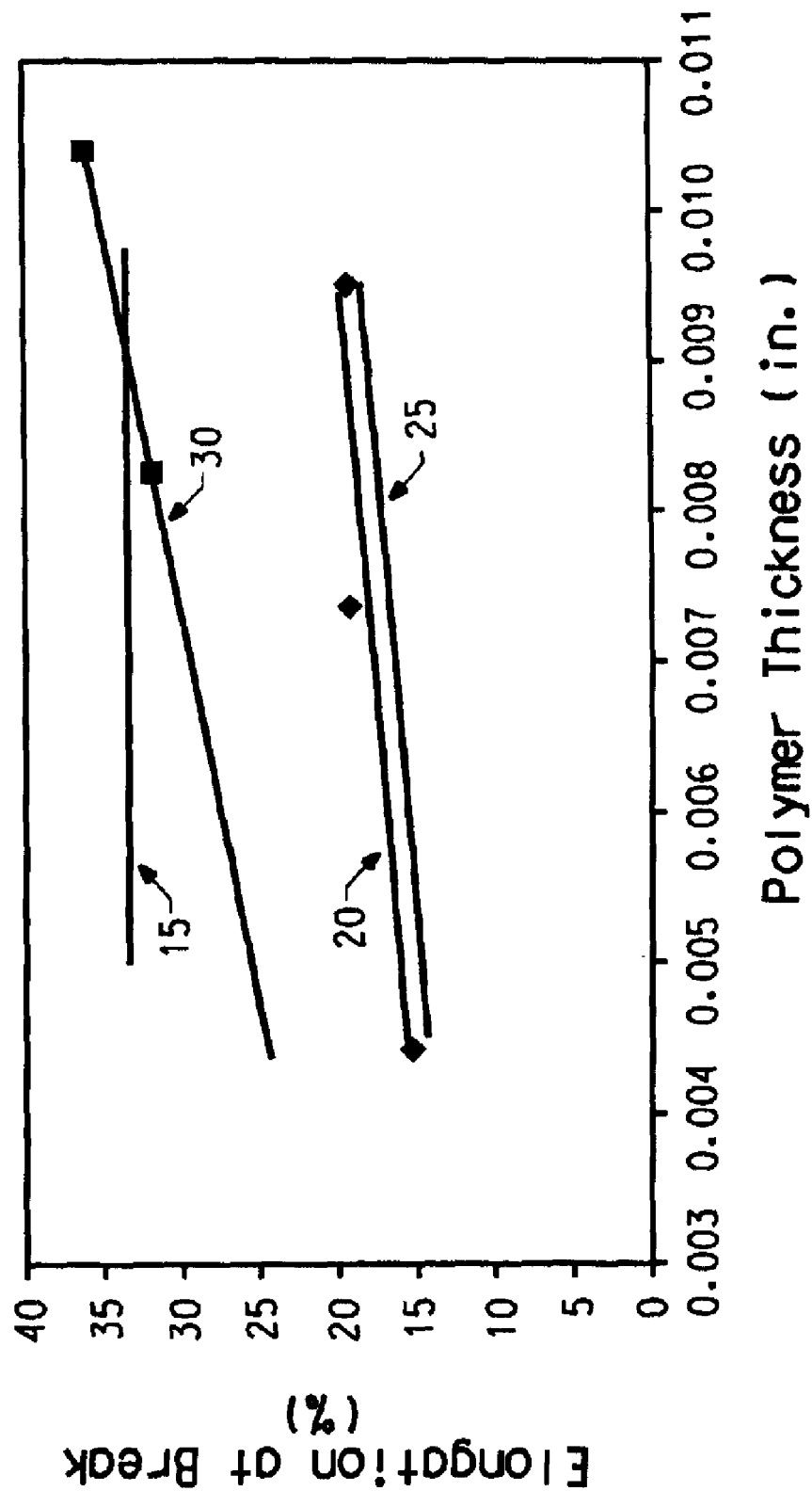
FIG. 2 is a representation of the improvement in initial tear resistance of the extrusion laminates of this invention over prior art adhesion laminates.

In all tests, the adhesive bonding between the polyester polymer and the inorganic paper was greater than the internal strength of the paper. The resulting data in Table 2 illustrates that laminates of this invention made by extrusion lamination had both improved initial tear resistance, as measured by having an elongation to break of greater than 30% in the cross-direction and greater than 25% in the machine direction, along with improved tear propagation resistance. As used below, EL stands for extrusion lamination, AL stands for adhesive lamination, MD stands for machine direction, and XD stands for the cross or traverse direction. FIG. 2 illustrates the improvement in elongation to break for these laminates, with the lines 10 and 15 representing the MD and XD values for the extrusion laminates and lines 20 and 25 representing the MD and XD values for adhesive laminates.

TABLE 2

| Type of Laminate | AL | AL | AL | EL | EL |
|---|---|---|---|---|---|
| Inorganic Sheet Thickness (mils) | 3 | 3 | 3 | 3 | 3 |
| Polymer Thickness (mils) | 4.5 | 7.4 | 9.4 | 8.4 | 10.4 |
| MD Elongation at Break (%) | 15 | 19 | 19 | 32 | 36 |
| XD Elongation at Break (%) | 14 | 18 | 18 | 33 | 35 |
| MD Average Tear Load (lb-f) | 1.0 | 1.9 | 2.2 | 3.6 | 4.0 |
| XD Average Tear Load (lb-f) | 1.3 | 2.0 | 2.2 | 4.1 | 4.6 |

What is claimed is:

1. A laminate of inorganic sheet and polyester resin having an overall thickness of 5 to 25 mils and having an elongation at break in both the cross direction and machine direction of at least 25%.

2. The laminate of claim 1 wherein the elongation at break in the cross direction is at least 30%.

3. The laminate of claim 2 wherein the thickness of the resin in the laminate is greater than the thickness of any individual inorganic sheet in the laminate.

4. The laminate of claim 1 wherein the inorganic sheet is a paper comprising an inorganic mineral, an inorganic reinforcement, and a binder.

5. The laminate of claim 4 wherein the inorganic mineral includes aluminum silicate.

6. The laminate of claim 4 wherein the inorganic reinforcement includes glass fiber.

7. The laminate of claim 4 wherein the binder includes acrylonitrile latex.

8. The laminate of claim 1 wherein the polyester resin is poly(ethylene terephthalate).

9. The laminate of claim 8 wherein the poly(ethylene terephthalate) includes a comonomer selected from the group of diethylene glycol, cyclohexanedimethanol, poly(ethylene glycol), glutaric acid, azelaic acid, sebacic acid, and isophthalic acid.

10. The laminate of claim 8 wherein the poly(ethylene terephthalate) includes a branching agent selected from the group of trimesic acid, pyromellitic acid, trimethylolpropane, trimethyloloethane, and pentaerythritol.

11. The laminate of claim 1 wherein the polyester resin is poly(ethylene naphthalate).

12. The laminate of claim 1 wherein the polyester resin is sandwiched between two inorganic sheets.

13. The laminate of claim 12 wherein the polyester resin sandwiched between two inorganic sheets includes a layered combination of resins.

14. An electrical device containing an electrical conductor and an insulating laminate comprising inorganic sheet and polyester resin, said laminate having an overall thickness of 5 to 25 mils and having an elongation at break in both the cross direction and the machine direction of at least 25%.

15. The electrical device of claim 14 wherein the laminate has an elongation at break in the cross direction of at least 30%.

16. The electrical device of claim 14 which is a transformer.

* * * * *